United States Patent
Cheng et al.

(10) Patent No.: US 9,436,646 B2
(45) Date of Patent: Sep. 6, 2016

(54) COMBINED SOCKETS FOR SELECTIVELY REMOVABLE CARDS IN COMPUTING DEVICES

(71) Applicant: QUALCOMM Incorporated, San Diego, CA (US)

(72) Inventors: Jianming Cheng, Shanghai (CN); Jianxiang Wu, Shanghai (CN); Wei Yan, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 14/193,887

(22) Filed: Feb. 28, 2014

(65) Prior Publication Data

US 2015/0248365 A1    Sep. 3, 2015

(51) Int. Cl.
*G06F 13/12*    (2006.01)
*H04B 1/38*    (2015.01)
*G06F 13/40*    (2006.01)
*G06K 7/00*    (2006.01)

(52) U.S. Cl.
CPC ........... *G06F 13/409* (2013.01); *G06K 7/0043* (2013.01)

(58) Field of Classification Search
CPC ........................................................ H04B 1/38
USPC ........................................................ 710/313
See application file for complete search history.

(56) References Cited

U.S. PATENT DOCUMENTS 6,623,304 B2    9/2003    Harasawa et al.
8,568,174 B2 *    10/2013    Liu ........................ H01R 27/02
                                                    439/630
2007/0060198 A1 *    3/2007    Kuo ..................... H04M 1/0202
                                                    455/558
2008/0020800 A1 *    1/2008    Xu ....................... G06K 7/0021
                                                    455/558
2012/0164872 A1    6/2012    Katayanagi
2013/0288535 A1    10/2013    You et al.

FOREIGN PATENT DOCUMENTS

CN    203014103 U    6/2013
EP    2000946 A1    12/2008
JP    2001297810 A    10/2001

OTHER PUBLICATIONS

International Search Report and Written Opinion for PCT/US2015/018014, mailed Apr. 30, 2015, 9 pages.
AVX: "9162 SIM/microSD Micro Combination Connector," Datasheet, pp. 23-24, Document created Jul. 5, 2013, accessed from http://www.avx.com/docs/catalogs/9162-5.pdf on Oct. 4, 2013.
International Preliminary Report on Patentability for PCT/US2015/018014, mailed Feb. 15, 2016, 15 pages.

* cited by examiner

Primary Examiner — Titus Wong
(74) Attorney, Agent, or Firm — Withrow & Terranova, PLLC

(57)    ABSTRACT

Combined sockets for selectively removable cards in computing devices are disclosed. In one embodiment, a socket is provided that can accommodate both a subscriber identification module (SIM) card and a secure digital (SD) card. The cards are held in place within the socket in a back to back configuration by springs which further help insure that contacts on the cards are electrically coupled to conductive pins in the socket. While it is contemplated that the socket will be used in mobile terminals such as smart phones and tablets, the socket may be used in other computing devices that use such cards.

28 Claims, 12 Drawing Sheets

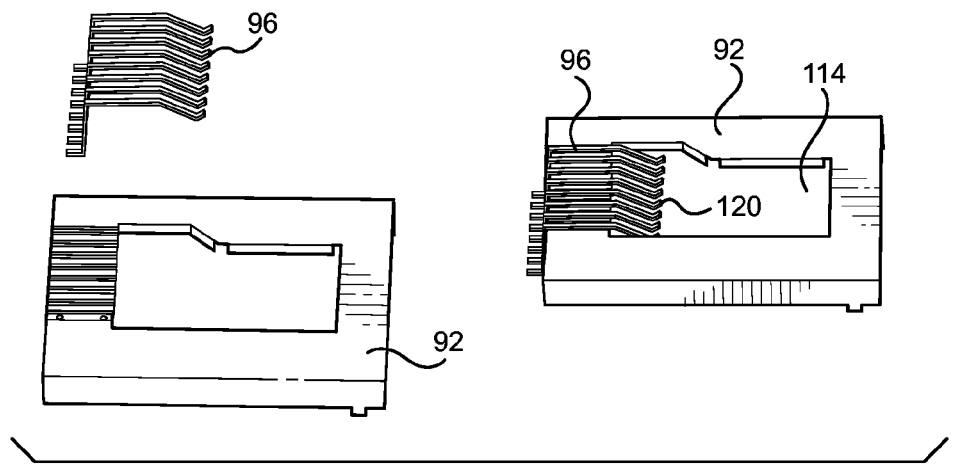
FIG. 7A
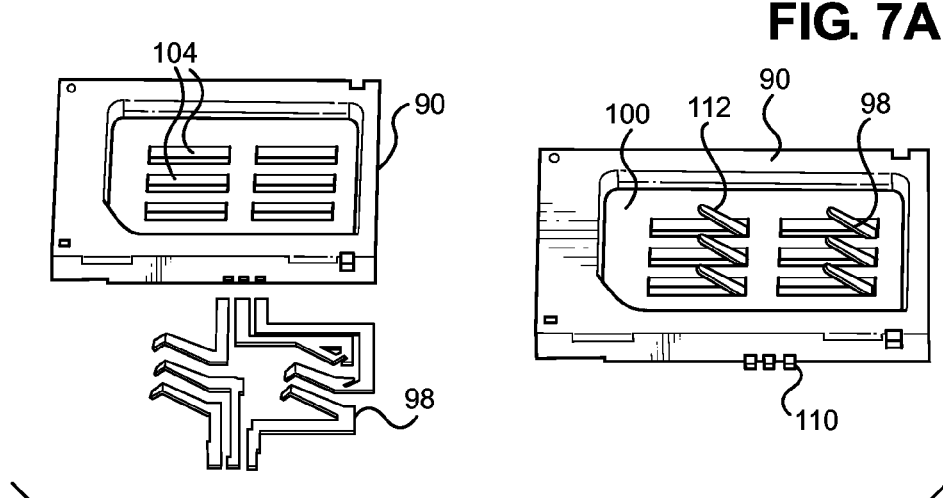
FIG. 7B
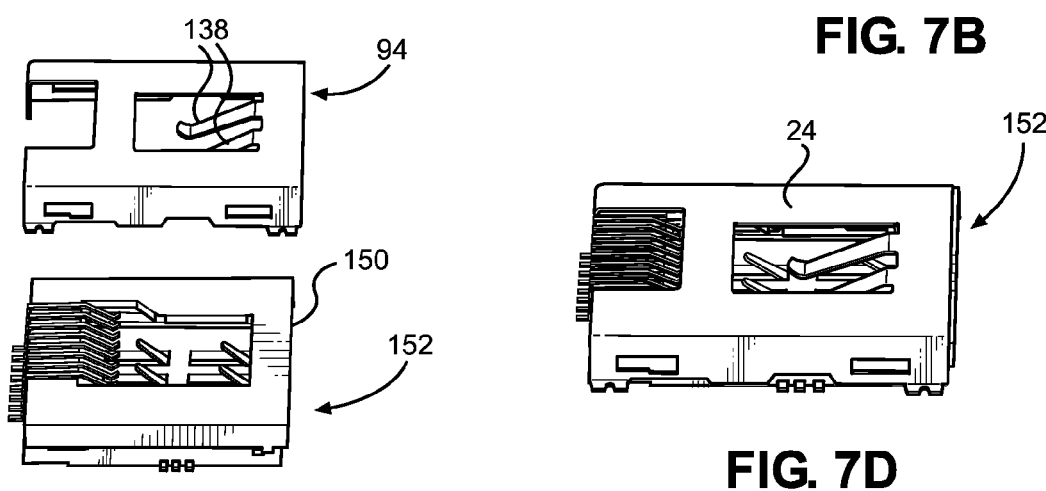
FIG. 7C
FIG. 7D

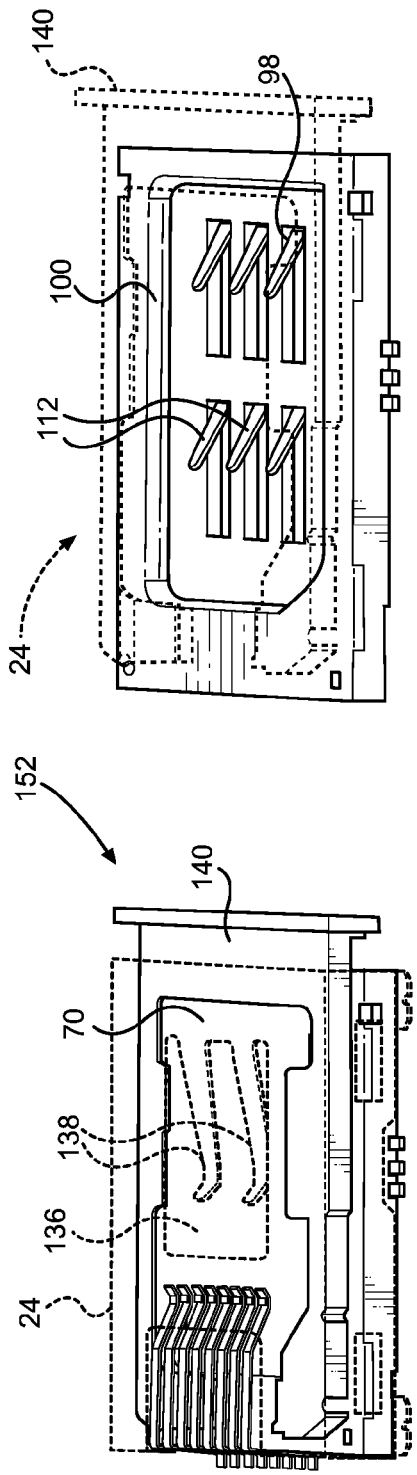
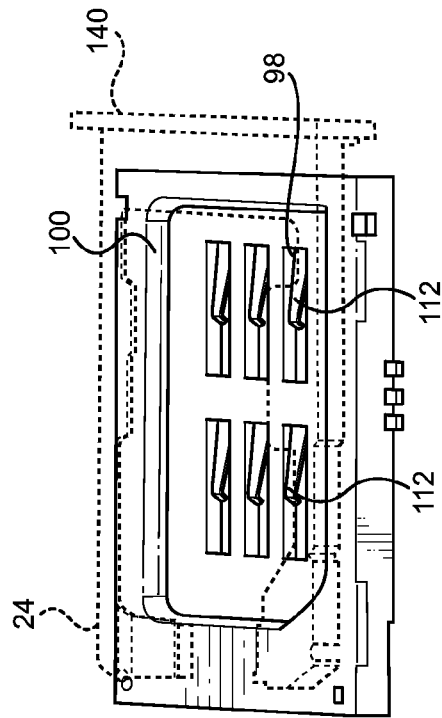
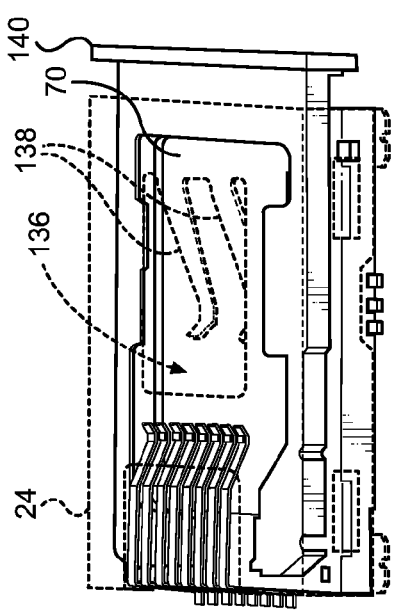
FIG. 8E  FIG. 8F  FIG. 8G  FIG. 8H

COMBINED SOCKETS FOR SELECTIVELY REMOVABLE CARDS IN COMPUTING DEVICES

BACKGROUND

I. Field of the Disclosure

The technology of the disclosure relates generally to sockets for cards in computing devices.

II. Background

Computing devices of all shapes and sizes may include one or more sockets that receive removable cards therein. For example, laptop (and even desktop) computers may use a personal computer memory card international association (PCMCIA) card; mobile phones may have a subscriber identification module (SIM) card; cameras and/or mobile terminals may have a memory card slot such as a secure digital (SD) or the like. Even within types of cards, there may be multiple formats. For example, SD cards come in at least miniSD, microSD, SDHC, SDXC, SDIO and other formats. Such cards are designed to be inserted within a socket on the computing device and conductive pins on the card mate with conductors within the socket to form electrical connections through which signals may pass including, but not limited to: data, clock signals, command signals, power, and the like.

In larger computing devices it is relatively easy to accommodate multiple sockets to accommodate multiple removable cards. Such larger devices may have ample surface area on which to place the sockets, such that some computing devices may have multiple sockets of a particular type. Additionally, within such larger computing devices there is ample room for printed circuit boards to support the specialized connectors and conductors of the sockets.

While larger computing devices have the luxury of plural sockets, smaller computing devices such as smart phones and other mobile terminals do not have the same luxury. Each socket consumes a portion of the limited surface area of the mobile terminal. For smart phones that are routinely placed inside an additional protective housing, the back surface of the mobile terminal is typically not available for such a socket, further limiting the sockets to the outer circumference of the mobile terminal. While accommodating such sockets raises engineering concerns about making sure the conductors are properly positioned, electromagnetic interference (EMI) concerns are addressed, and that signals are passed correctly, modern mobile terminals also rely on aesthetic appeal for commercial advantage. Many consumers opine that plural sockets are unsightly and detract from the aesthetic appeal of the mobile terminals.

SUMMARY OF THE DISCLOSURE

Embodiments disclosed in the detailed description include combined sockets for selectively removable cards in computing devices. In an exemplary embodiment, a socket is provided that can accommodate both a subscriber identification module (SIM) card and a secure digital (SD) card. The cards are held in place within the socket in a back to back configuration by springs which further help insure that contacts on the cards are electrically coupled to conductive pins in the socket. While it is contemplated that the socket will be used in mobile terminals such as smart phones and tablets, the socket may be used in other computing devices that use such cards.

By providing a single socket configured to accept both cards, the housing of an associated computing device needs only define one aperture. Reduction in the number of apertures may make the housing easier to manufacture. Further, reduction in the number of apertures improves the aesthetic appeal of the housing. By placing the cards in a back to back arrangement, the pins of the cards face opposite directions making it easier to route conductors to the cards to effectuate communication to the cards. The ease of routing conductors may improve space utilization of an associated circuit board within the computing device.

In this regard in one embodiment, a socket is disclosed. The socket comprises an upper socket base and a lower socket base coupled to the upper socket base to define an aperture sized to allow insertion of a SIM card and SD card and delimit an interior space sized to accommodate the SIM card and SD card in a back to back abutting relationship. The socket also comprises a first set of pins coupled to the upper socket base and configured to interoperate with the SD card and a second set of pins coupled to the lower socket base and configured to interoperate with the SIM card.

In another embodiment, a mobile terminal is disclosed. The mobile terminal comprises a housing defining an aperture through which selectively removable cards may pass and a socket comprising an upper socket base and a lower socket base coupled to the upper socket base to define an aperture sized to allow insertion of a SIM card and a SD card and delimit an interior space sized to accommodate the SIM card and SD card in a back to back abutting relationship. The mobile terminal also comprises a first set of pins coupled to the upper socket base and configured to interoperate with the SD card and a second set of pins coupled to the lower socket base and configured to interoperate with the SIM card.

In another embodiment, a method of inserting cards into a socket is disclosed. The method comprises placing a SIM card into a card insertion bracket; pushing the SIM card into the socket; and using springs on a socket cover to push the SIM card into a SIM recess in a lower socket base. The method also comprises coupling conductors on the SIM card to a lower pin set in the socket; removing the card insertion bracket; and reorienting a bracket spring in the card insertion bracket. The method also comprises placing a SD card into the card insertion bracket; holding the SD card in the card insertion bracket with the bracket spring; pushing the SD card into the socket such that the SD card is back to back with the SIM card within the socket; and using the springs on the socket cover to push the SD card into contact with SD pins in the socket.

BRIEF DESCRIPTION OF THE FIGURES

FIGS. 7A-7D illustrate various assembly steps for the socket of the present disclosure;

DETAILED DESCRIPTION

Figure 1:
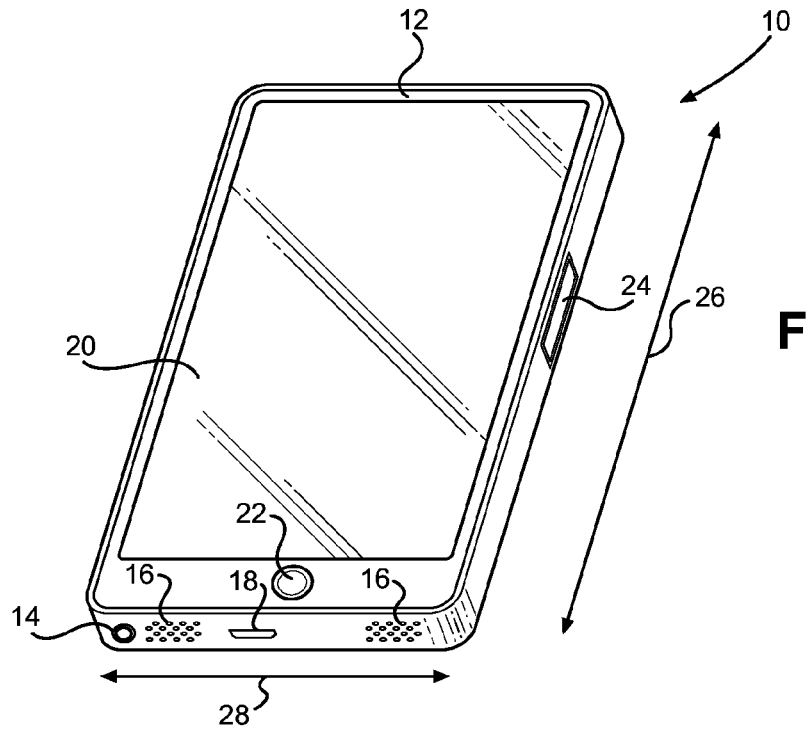
FIG. 1 is a perspective view of an exemplary mobile terminal with a housing defining a socket configured to accept two selectively removable cards according to embodiments of the present disclosure.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include combined sockets for selectively removable cards in computing devices. In an exemplary embodiment, a socket is provided that can accommodate both a subscriber identification module (SIM) card and a secure digital (SD) card. The cards are held in place within the socket in a back to back configuration by springs which further help insure that contacts on the cards are electrically coupled to conductive pins in the socket. While it is contemplated that the socket will be used in mobile terminals such as smart phones and tablets, the socket may be used in other computing devices that use such cards.

By providing a single socket configured to accept both cards, the housing of an associated computing device needs only define one aperture. Reduction in the number of apertures may make the housing easier to manufacture. Further, reduction in the number of apertures improves the aesthetic appeal of the housing. By placing the cards in a back to back arrangement, the pins of the cards face opposite directions making it easier to route conductors to the cards to effectuate communication to the cards. The ease of routing conductors may improve space utilization of an associated circuit board within the computing device.

In this regard, FIG. 1 is a mobile terminal 10 that includes a combined socket according to an exemplary embodiment of the present disclosure. Mobile terminal 10 may be a smart phone, cell phone, or other mobile computing device as is well understood. Mobile terminal 10 has a housing 12 that includes one or more apertures such as an audio jack 14, speakers 16, and a power/universal serial bus (USB) jack 18. Not pictured, but also present may be a camera aperture and/or a microphone aperture as is well understood. Mobile terminal 10 may further include a touch screen display 20 and a command button 22. Alternatively, a keyboard may be supplied and the display 20 may not include touch functionality. As is well understood, various hardware elements form part of the user interface for the mobile terminal 10 (e.g., microphone, command button 22, touch screen display 20, speakers 16, and the like). An exemplary embodiment of the present disclosure is the combined socket 24. As illustrated, the combined socket 24 is positioned on a longer (longitudinal) side 26 of the housing 12, but it should be appreciated that the combined socket 24 may be positioned on a shorter (lateral) side 28 of the housing 12 without departing from the scope of the present disclosure. Likewise, while not illustrated, the combined socket 24 could be positioned on a back side of the housing 12 (i.e., opposite the touch screen display 20). The generally small size of smart phones and other mobile computing devices makes the combined socket 24 particularly advantageous because the combined socket 24 consumes relatively little space on the outer circumference (or other location) of the housing 12. Reduced consumption helps preserve the aesthetic appeal of the housing 12 and may facilitate simple internal routing of conductors on the printed circuit board of the mobile terminal 10 while preserving space on the printed circuit board.

Figure 2:
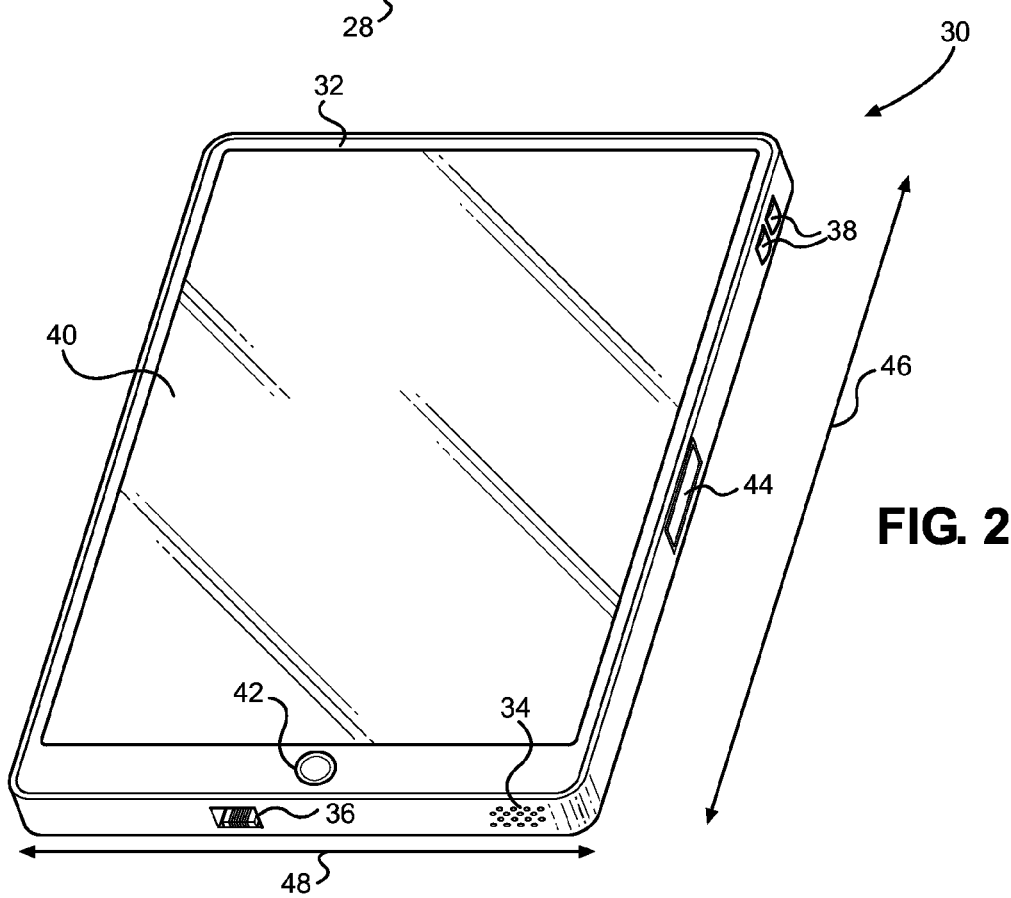
FIG. 2 is a perspective view of an exemplary tablet device with a housing defining a socket configured to accept two selectively removable cards according to embodiments of the present disclosure.

While smart phones and smaller mobile computing devices may particularly benefit from use of the combined socket 24, the present disclosure is not limited to just small mobile computing devices. In this regard, FIG. 2 illustrates a tablet 30. As used herein, the term mobile terminal includes devices such as tablet 30, but tablet 30 is illustrated separately to further illustrate the versatility of the combined socket of the present disclosure. Tablet 30 has a housing 32 that includes one or more apertures such as an audio jack (not illustrated), speakers 34, and a power/universal serial bus (USB) jack 36. Volume control buttons 38 may be included. Not pictured, but also present may be a camera aperture and/or a microphone aperture as is well understood. Tablet 30 may further include a touch screen display 40 and a command button 42. Alternatively, a keyboard may be supplied and the display 40 may not include touch functionality. As with mobile terminal 10, various hardware elements may form part of the user interface for the tablet 30. An exemplary embodiment of the present disclosure is the combined socket 44. As illustrated, the combined socket 44 is positioned on a longer (longitudinal) side 46 of the housing 32, but it should be appreciated that the combined socket 44 may be positioned on a shorter (lateral) side 48 of the housing 32 without departing from the scope of the present disclosure. Likewise, while not illustrated, the combined socket 44 could be positioned on a back side of the housing 32 (i.e., opposite the touch screen display 40). Even though the tablet 30 is larger than mobile terminal 10, space within the tablet 30 is still at a premium. Thus, the combined socket 44 consumes relatively little space on the outer circumference (or other location) of the housing 32 and helps preserve the aesthetic appeal of the housing 32. The combined socket 44 may facilitate simple internal routing of conductors on the printed circuit board of the tablet 30 while preserving space on the printed circuit board.

Figure 3:
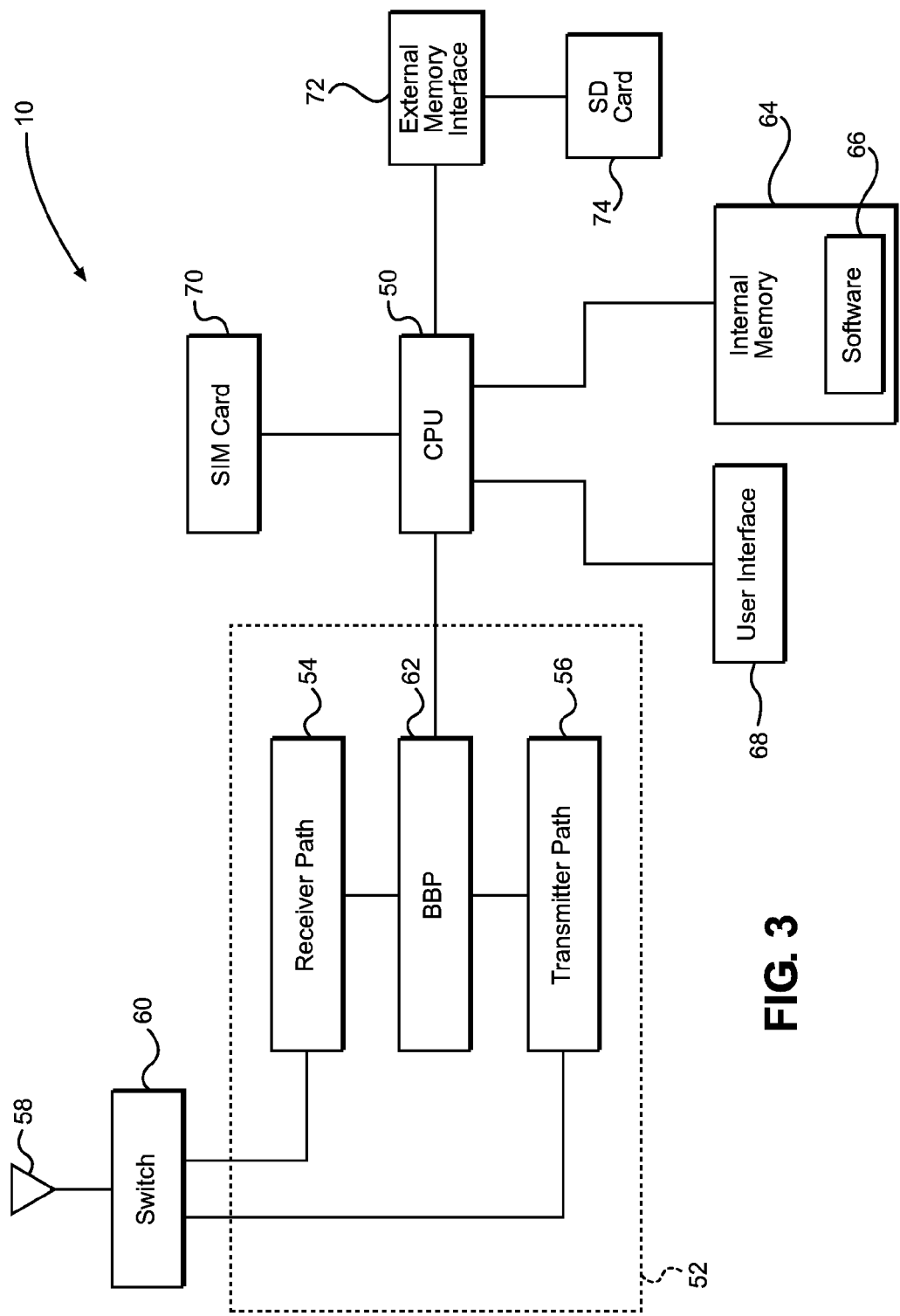
FIG. 3 is a block diagram of a computing device such as the mobile terminal of FIG. 1 or the tablet of FIG. 2.

A generic mobile terminal 10 is illustrated in FIG. 3 as a block diagram. The mobile terminal 10 may include a central processing unit (CPU) 50 and a transceiver 52. The transceiver 52 may include a receiver path 54, a transmitter path 56, an antenna 58, a switch 60, and a base band processor (BBP) 62. The CPU 50 is coupled to internal memory 64 having software 66 stored therein. Together the CPU 50 and the software 66 operate as a control system that enables the computing functionality of the mobile terminal 10. The CPU 50 and the control system may be operatively coupled to the user interface 68, which, as noted above, may include the touch screen display 20, speakers 16, microphone, and other hardware elements.

The receiver path 54 receives information bearing radio frequency (RF) signals from one or more remote transmitters provided by a base station (not illustrated). A low noise amplifier (not shown) amplifies the signal. A filter (not shown) minimizes broadband interference in the received signal, while down conversion and digitization circuitry (not shown) down converts the filtered, received signal to an intermediate or baseband frequency signal, which is then digitized into one or more digital streams. The receiver path 54 typically uses one or more mixing frequencies generated by the frequency synthesizer. The BBP 62 processes the digitized received signal to extract the information or data bits conveyed in the signal. As such, the BBP 62 is typically implemented in one or more digital signal processors (DSPs) or as a separate integrated circuit (IC) as needed or desired.

With continued reference to FIG. 3, on the transmit side, the BBP 62 receives digitized data, which may represent voice, data, or control information, from the CPU 50, and encodes it for transmission. The encoded data is output to the transmitter path 56, where it is used by a modulator (not shown) to modulate a carrier signal at a desired transmit frequency. An RF power amplifier (not shown) amplifies the modulated carrier signal to a level appropriate for transmission, and delivers the amplified and modulated carrier signal to the antenna 58 through the switch 60. While the transceiver 52 is specifically described with relation to the RF signals associated with a cellular signal, the present disclosure is not so limited. For example, a transceiver operating according to other wireless protocols may also benefit from inclusion of embodiments of the present disclosure. Thus, transceivers operating according to standards such as BLUETOOTH, the various Institute of Electrical and Electronic Engineers (IEEE) 802.11 standards, Universal Mobile Telecommunications System (UMTS), High Speed Packet Access (HSPA), Long Term Evolution (LTE), and other wireless protocols may all use embodiments of the present disclosure.

Many mobile terminals 10 rely on a SIM card 70 to store certain information relating to operation of the mobile terminal 10 within a cellular network. Accordingly, the CPU 50 may communicate with a SIM card 70 inserted into a combined socket 24 as illustrated above and further explained below. Additionally, the CPU 50 may be configured to communicate with an external memory interface 72 that operates with a removable memory card such as an SD card 74. While illustrated removed from the SIM card 70, the SD card 74 may also be inserted into the combined socket 24 of the present disclosure.

Figure 4:
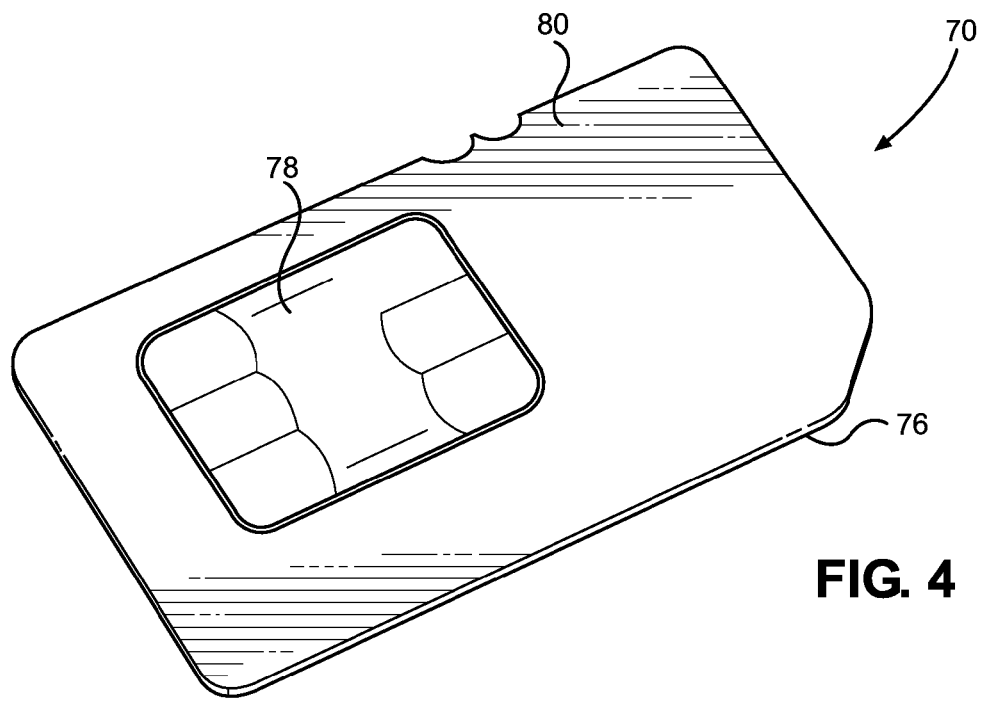
FIG. 4 is a perspective view of subscriber identification module (SIM) card that may be inserted into a socket of the present disclosure.

While conventional, a SIM card 70 is illustrated in FIG. 4. Specifically, the SIM card 70 includes a housing 76 that follows a predefined form factor. A number of electrically conductive contacts 78 are provided on one face 80 of the SIM card 70. The precise arrangement of the contacts 78 is dictated by various proprietary formats set by the cellular provider in whose network the mobile terminal 10 operates (e.g., AT&T may have a different format from VERIZON). While a SIM card is specifically illustrated, variations such as a microSIM card exist and may be used with embodiments of the combined socket 24 of the present disclosure.

Figure 5:
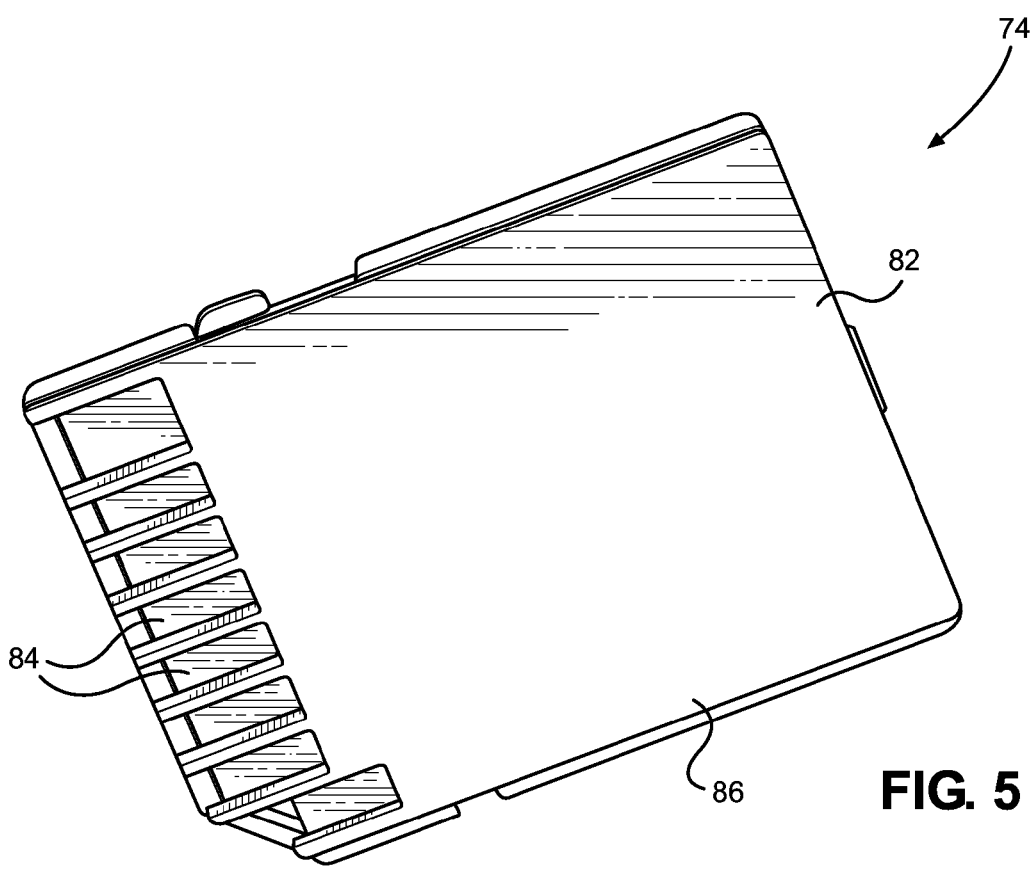
FIG. 5 is a perspective view of a secure digital (SD) card that may be inserted into a socket of the present disclosure.

Similarly, an SD card 74 is illustrated in FIG. 5. The SD card 74 includes a housing 82 that follows a predefined form factor. A number of electrically conductive contacts 84 are provided on one face 86 of the SD card 74. While an SD card is specifically illustrated, variations such as a microSD card exist and may be used with embodiments of the combined socket 24 of the present disclosure.

As noted, the combined socket 24 provides a single aperture in a mobile terminal 10 into which two selectively removable cards may be placed. In an exemplary embodiment, the selectively removable cards are a SIM card 70 and an SD card 74 that are inserted within the combined socket 24 so as to be in a back to back configuration such that the contacts 78, 84 are on opposite sides to engage electrical conductors within the combined socket 24.

Figure 6:
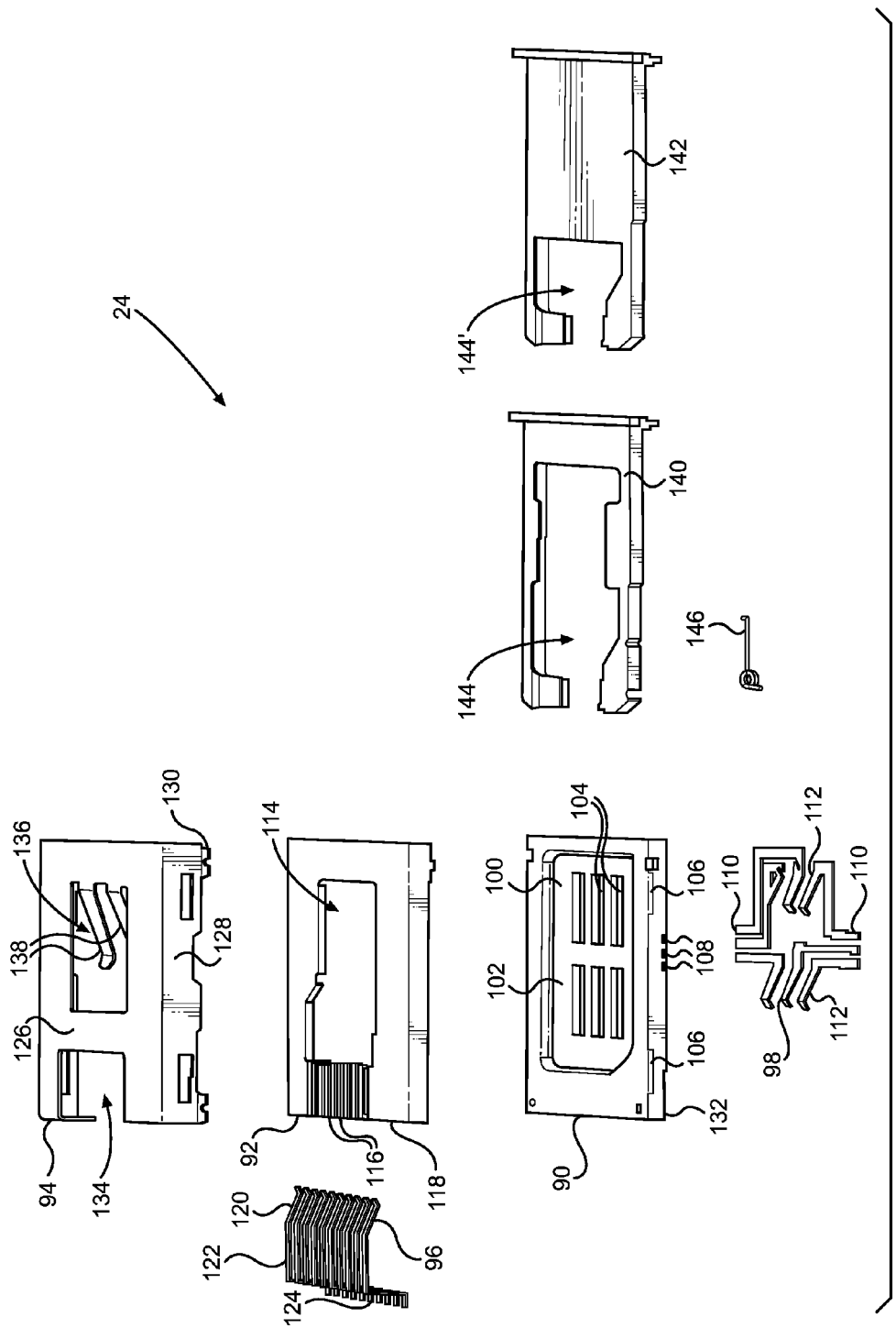
FIG. 6 is an exploded view of the elements of the socket of the present disclosure.

In this regard, FIG. 6 provides an exploded view of the elements of an exemplary combined socket 24. The combined socket 24 includes a lower socket base 90, an upper socket base 92 and a socket cover 94. In an exemplary embodiment, the lower socket base 90 and upper socket base 92 are made from plastic. The socket cover 94 may be made from 0.15 mm steel. A first set of pins 96 is coupled to the upper socket base 92 and a second set of pins 98 is coupled to the lower socket base 90. In an exemplary embodiment, the first and second set of pins 96, 98 may be made from 0.1 mm steel. The lower socket base 90 includes a recess 100 that conforms to the form factor of the SIM card 70. A lower surface 102 of the recess 100 includes apertures 104 through which the second set of pins 98 extends. One or more beveled or shouldered divots 106 help provide a snap fit connection with the upper socket base 92. A plurality of channels 108 exist to accommodate external leads 110 of the second set of pins 98. The second set of pins 98 includes angled portions 112 that are configured to mate with corresponding contacts 78 of the SIM card 70. The angled portions 112 extend upwardly through the apertures 104 and provide a spring action against the SIM card 70.

With continued reference to FIG. 6, the upper socket base 92 includes an aperture 114 and channels 116 extending from an external edge 118 to the aperture 114. The first set of pins 96 includes an angled portion 120 which extends downwardly through the aperture 114 and a second portion 122 which is configured to fit within the channels 116. The first set of pins 96 further includes a tab portion 124 that allows conductive leads to be coupled to the first set of pins 96. The angled portion 120 of the first set of pins 96 are positioned so as to interoperate with the contacts 84 of the SD card 74. While not illustrated, the interior surface of the upper socket base 92 includes protuberances which facilitate snap fit engagement with the lower socket base 90.

With continued reference to FIG. 6, the socket cover 94 is sized so as to fit over the combined unit formed from the upper socket base 92 and lower socket base 90. That is, the socket cover 94 includes a top 126 with sides 128 extending downwardly therefrom with sufficient height to allow tabs 130 to snap fit around a bottom surface 132 of lower socket base 90. The top 126 includes a first aperture 134 allowing access to the first set of pins 96 and a second aperture 136. The socket cover 94 further includes two spring elements 138 that extend downwardly into the space delimited by the second aperture 136. The two spring elements 138 are designed to push the SIM card 70 into the recess 100 during initial insertion of the SIM card 70 into the combined socket 24. Further, the two spring elements 138 push against the SD card 74, holding the SD card 74 in place.

With continued reference to FIG. 6, use of the combined socket 24 may be enhanced through use of an insertion tool 140 and an extraction tool 142. The insertion tool 140 includes an aperture 144 configured to hold a SIM card 70 in a first configuration. The extraction tool 142 includes a similar aperture 144' although it is smaller for reasons explained below with reference to FIGS. 9A-9C below. Further, the insertion tool 140 includes a bracket spring 146 that allows the insertion tool to hold an SD card 74 in a second configuration. The two configurations are explained in greater detail below with reference to FIGS. 8L and 8M. The extraction tool 142 helps pull the cards 70, 74 out of the combined socket 24. Alternatively, the insertion tool 140 may be used for such purpose as needed or desired.

To further understanding of the combined socket 24, FIGS. 7A-7D illustrate assembly of the elements of the combined socket 24. In this regard, FIG. 7A shows assembly of the upper socket base 92 with first set of pins 96. The first set of pins 96 may be formed and then integrated with the upper socket base 92 through insert-molding or the like. FIG. 7A helpfully illustrates how the angled portion 120 extends into aperture 114. Similarly, FIG. 7B shows assembly of the lower socket base 90 with the second set of pins 98. Again, the second set of pins 98 may be formed and then integrated with the lower socket base 90 through insert molding or the like. FIG. 7B helpfully illustrates how the angled portion 112 extends upwardly through the apertures 104 and into the recess 100. Additionally, external leads 110 extending from the side of the lower socket base 90 allow easy coupling to conductors on the printed circuit board within the mobile terminal 10.

As noted above, the shouldered divots 106 of the lower socket base 90 snap fit with matching protuberances in the upper socket base 92, so that the assembled socket base 150 of FIG. 7C is ready to mate with the socket cover 94 resulting in the combined socket 24 of FIG. 7D. Assembled socket base 150 defines an aperture sized to allow insertion of the SIM card 70 and the SD card 74.

Figure 8A:
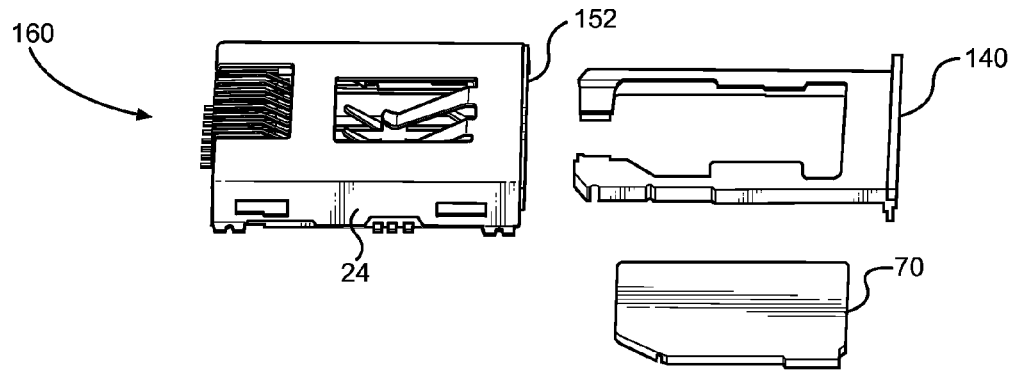
FIGS. 8A-8P illustrate the process of inserting the two cards into the socket of FIG. 7D.
Figure 8B:
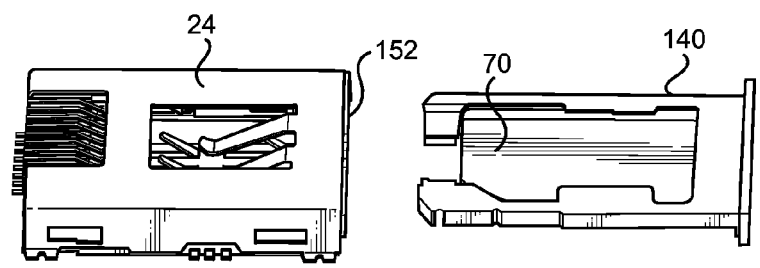
Figure 8C:
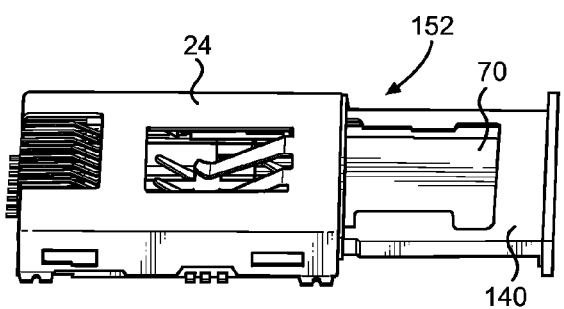
Figure 8D:
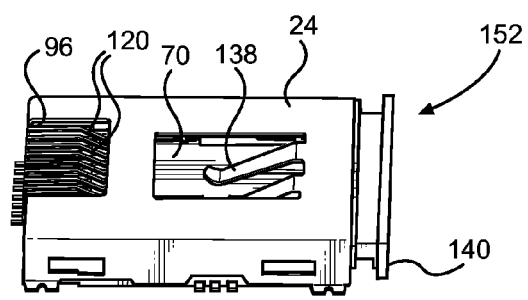
Figure 8I:
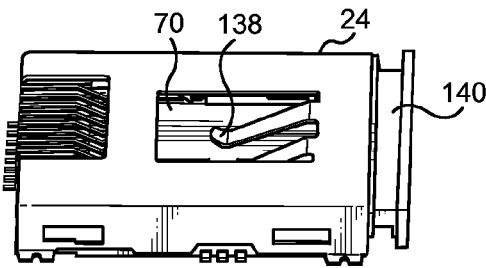
Figure 8J:
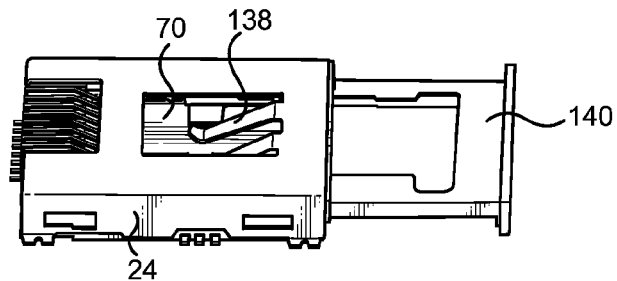
Figure 8K:
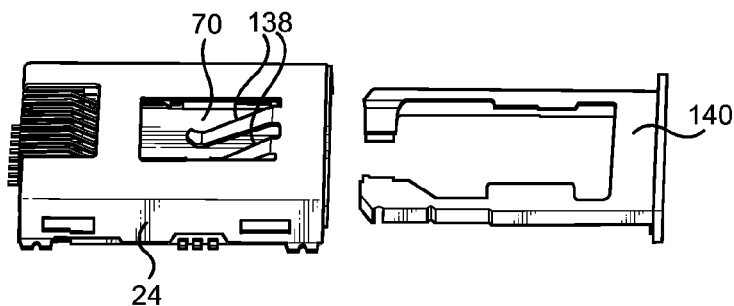
Figure 8L:
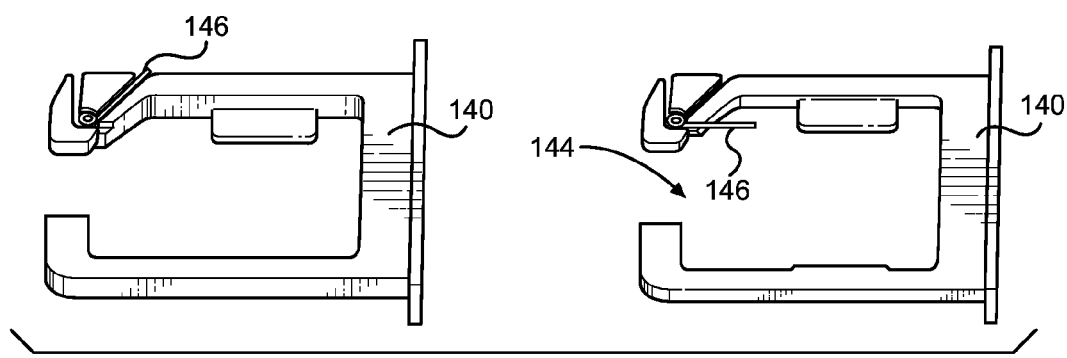
Figure 8M:
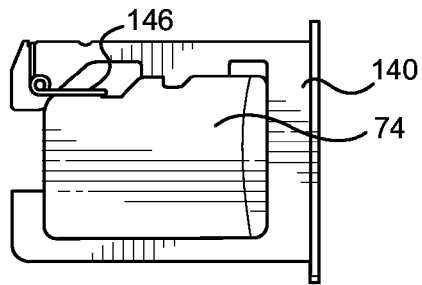
Figure 8N:
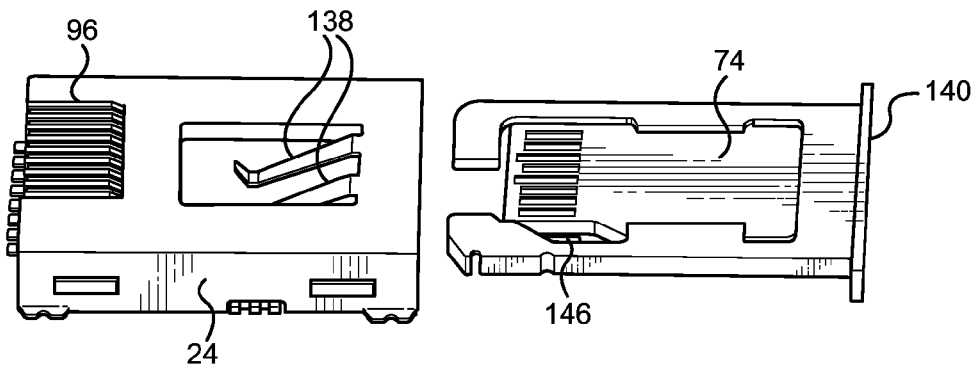
Figure 8O:
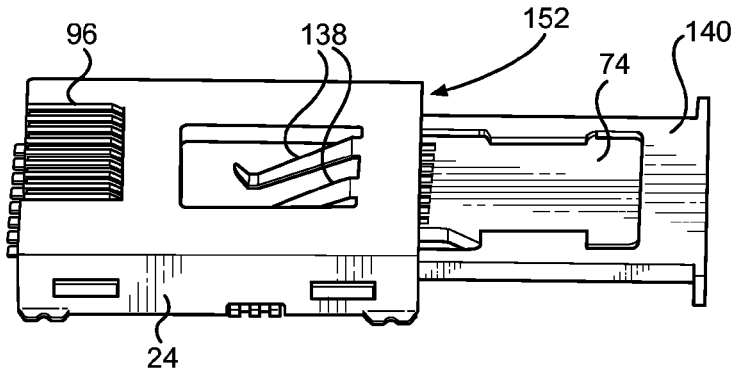
Figure 8P:
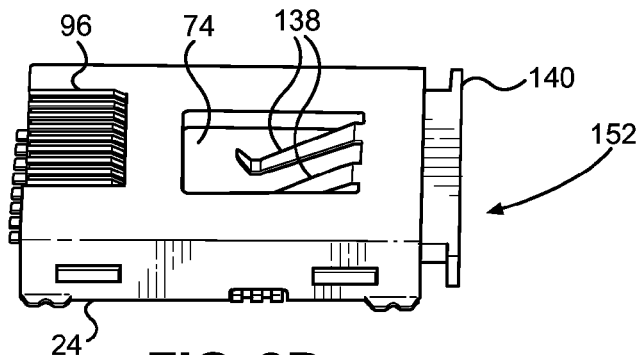

FIGS. 8A-8P graphically illustrate an insertion process 160 of the SIM card 70 and SD card 74 into the combined socket 24. Process begins in FIG. 8A with the SIM card 70 readied for insertion with the insertion tool 140. That is, as better illustrated in FIG. 8B, the SIM card 70 is placed into the complementary recess defined by the insertion tool 140. Then, as illustrated in FIG. 8C, the insertion tool is inserted into the aperture 152. During insertion, as illustrated in 8D, the back side of the SIM card 70 pushes the two spring elements 138 upward. The angled portions 120 of the first set of pins 96 also impinge on the back side of the SIM card 70. Once the insertion tool 140 is fully inserted into the combined socket 24, the two spring elements 138 push on the back side of the SIM card 70 and force the SIM card 70 downward into recess 100 as illustrated in FIGS. 8E and 8F. Likewise, the angled portions 112 of the second set of pins 98 initially are angled upwardly, but as the strength of the two spring elements 138 push the SIM card 70 downwardly into the recess 100, the angled portions 112 flex (see FIGS. 8G and 8H) so that they are properly engaged with the contacts 78 of the SIM card 70.

Thus, in FIG. 8I, the two spring elements 138 have pushed the SIM card 70 down into the recess 100 (better illustrated in 8H), effectively disengaging the SIM card 70 from the insertion tool 140, allowing removal of the insertion tool 140 as illustrated in FIG. 8J. This leaves the SIM card 70 inserted into the combined socket 24 (see FIG. 8K).

Now the bracket spring 146 of the insertion tool 140 is repositioned as illustrated in FIG. 8L so that the bracket spring 146 extends into the aperture 144. In this second configuration, the bracket spring 146 may press against a side portion of the SD card 74 as the SD card 74 is placed within the insertion tool 140 (see FIG. 8M). Note that for insertion of the SD card 74, the contacts 84 are upwardly facing such that the SD card 74 will be back to back with the SIM card 70 on insertion into the combined socket 24 (see FIG. 8N). Likewise the contacts 84 are upward for engagement with the first set of pins 96.

The insertion tool 140 with the SD card 74 is then inserted through the aperture 152, pushing the two spring elements 138 (see FIG. 8O) out of the way until the insertion tool 140 is fully inserted (see FIG. 8P). The contacts 84 are then in contact with the first set of pins 96 and in particular with the angled portions 120. The friction of the back of the SIM card 70 and the force of the two spring elements 138 allows extraction of the insertion tool 140, while leaving the SD card 74 inserted.

Figure 9A:
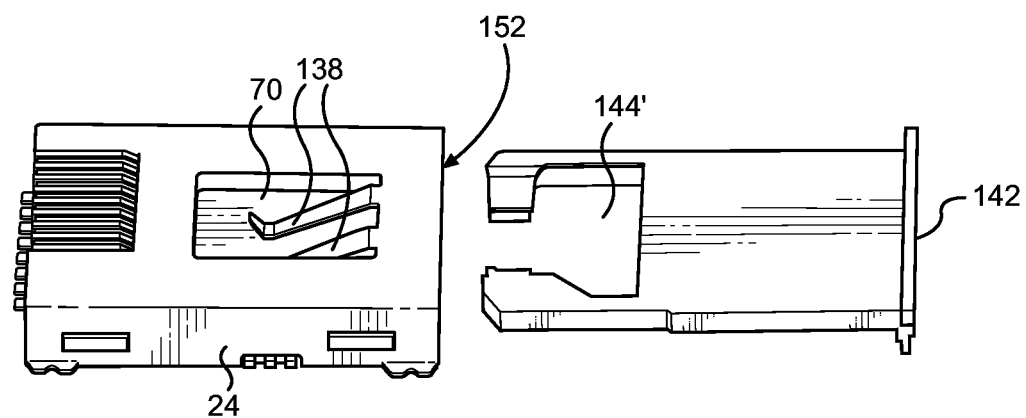
FIGS. 9A-9H illustrate the process of removing the two cards from the socket of FIG. 7D.
Figure 9B:
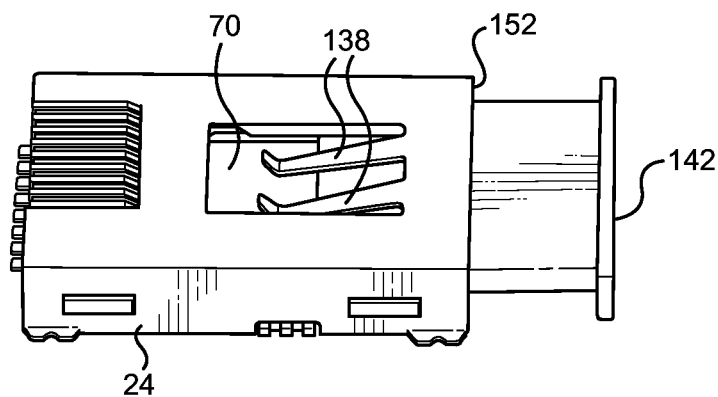
Figure 9C:
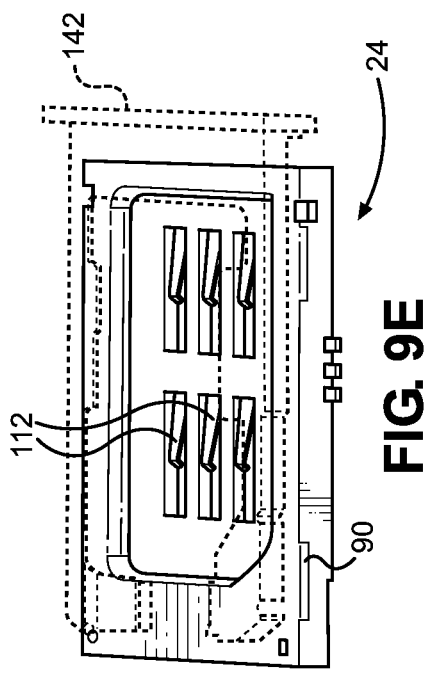

Removal of the SD card 74 is straight forward. However, removal of the SIM card 70 may require the use of extraction tool 142. This process is illustrated in FIGS. 9A-9H. In particular, the extraction tool 142 is readied as illustrated in FIG. 9A and then inserted into the aperture 152 (FIG. 9B).

Figure 9E:
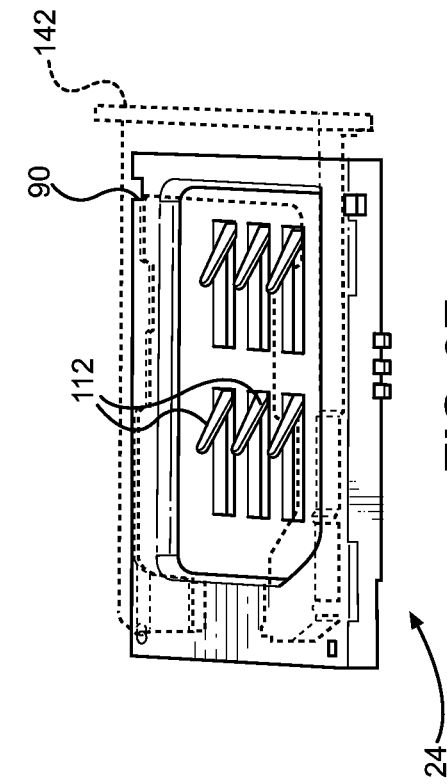
Figure 9D:
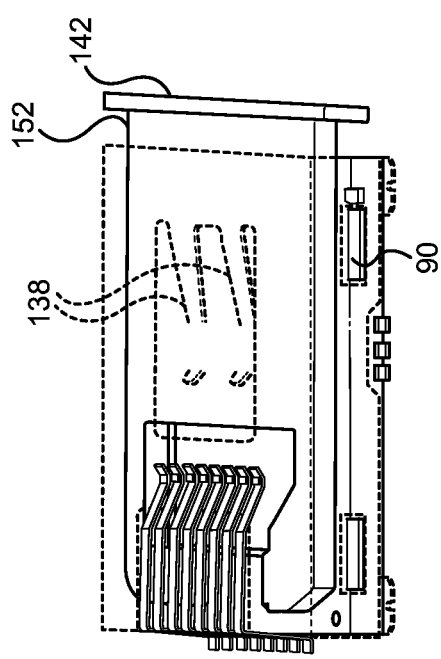
Figure 9F:
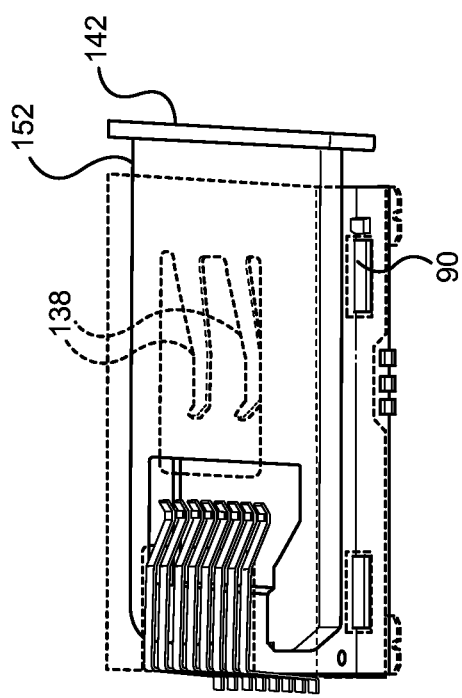
Figure 9G:
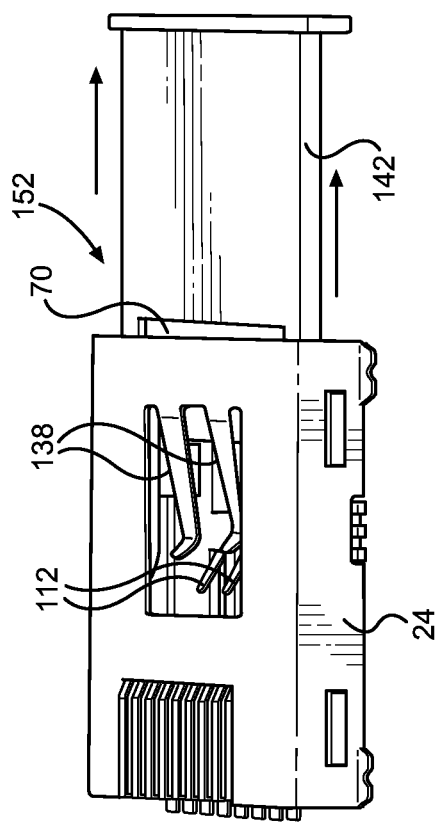

As noted above, aperture 144' is smaller than corresponding aperture 144 on the insertion tool 140. The reason for this difference is the presence of two spring elements 138. During insertion, the two spring elements 138 press down on the SIM card 70 and press the SIM card 70 into the recess 100. Thus, aperture 144 is sized so as to allow the spring elements 138 to press down on the SIM card 70. In contrast, during extraction, force from the spring elements 138 is undesirable. Accordingly, the aperture 144' is sized so as to block the spring elements 138 as better illustrated in FIGS. 9C and 9D. While the extraction tool 142 is blocking the spring elements 138, the spring action of the angled portions 112 of the second set of pins 98 push upwardly on the SIM card 70 and push the SIM card 70 upwardly into the extraction tool 142 (see FIGS. 9E and 9F illustrating the movement of the angled portions 112 and FIG. 9D where the extraction tool 142 has received the SIM card 70).

Figure 9H:
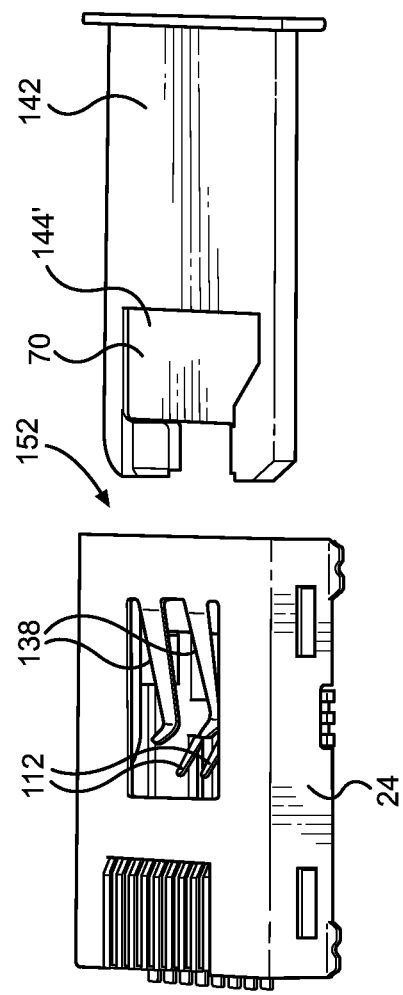

Once the SIM card 70 is seated in the extraction tool 142, the extraction tool 142 is pulled from the aperture 152 (see FIG. 9G) until the SIM card 70 is removed from the combined socket 24 (FIG. 9H).

While the above description has frequently used adjectives such as upper or lower, and prepositions such as beneath and above, it should be appreciated that the fundamental nature of mobile terminals renders such terms near meaningless because the mobile terminal may be manipulated readily in all three dimensions such that what is an upper element in a first orientation is a lower element in a second orientation. Accordingly, such positional adjectives and prepositions are intended to be relative terms used to facilitate the understanding of the relative positions of elements and are not intended to be absolute terms.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A socket comprising:
   an upper socket base;
   a lower socket base coupled to the upper socket base to define an aperture sized to allow insertion of a subscriber identification module (SIM) card and a secure digital (SD) card and delimit an interior space sized to accommodate the SIM card and the SD card in a back to back abutting relationship, such that contacts of the SD card and contacts of the SIM card face opposite directions;
   a first set of pins coupled to the upper socket base and configured to interoperate with the SD card; and
   a second set of pins coupled to the lower socket base and configured to interoperate with the SIM card.

2. The socket of claim 1 further comprising a socket cover positioned over the upper socket base.

3. The socket of claim 2, wherein the socket cover comprises a spring configured to press down on the SD card so that conductors on the SD card contact the first set of pins.

4. The socket of claim 1, wherein the first set of pins extends downwardly so as to contact pins on the SD card.

5. The socket of claim 1, wherein the second set of pins extends upwardly so as to contact pins on the SIM card.

6. The socket of claim 1, wherein the lower socket base defines pin apertures through which the second set of pins extends.

7. The socket of claim 1, wherein the lower socket base defines a recess sized to accommodate the SIM card therewithin.

8. The socket of claim 1, wherein the upper socket base defines an upper aperture through which the first set of pins extends.

9. The socket of claim 1, further comprising a card insertion tool configured to facilitate insertion of the SIM card and the SD card.

10. The socket of claim 9, wherein the card insertion tool comprises a bracket spring configured to move between a first orientation such that the bracket spring does not contact the SIM card and a second orientation such that the bracket spring contacts the SD card.

11. The socket of claim 1, wherein the SD card comprises a microSD card.

12. The socket of claim 1, wherein the SIM card comprises a microSIM card.

13. The socket of claim 1, wherein the aperture is a single aperture sized such that the aperture allows insertion of both the SIM card and the SD card with a card insertion tool.

14. A mobile terminal comprising:
    a housing defining an aperture through which selectively removable cards may pass; and
    a socket comprising: an upper socket base;
    a lower socket base coupled to the upper socket base to define an aperture sized to allow insertion of a subscriber identification module (SIM) card and a secure digital (SD) card and delimit an interior space sized to accommodate the SIM card and the SD card in a back to back abutting relationship, such that contacts of the SD card and contacts of the SIM card face opposite directions;
    a first set of pins coupled to the upper socket base and configured to interoperate with the SD card; and
    a second set of pins coupled to the lower socket base and configured to interoperate with the SIM card.

15. The mobile terminal of claim 14, wherein the socket further comprises a socket cover positioned over the upper socket base.

16. The mobile terminal of claim 15, wherein the socket cover comprises a spring configured to press down on the SD card so that conductors on the SD card contact the first set of pins.

17. The mobile terminal of claim 14, wherein the first set of pins extends downwardly so as to contact pins on the SD card.

18. The mobile terminal of claim 14, wherein the second set of pins extends upwardly so as to contact pins on the SIM card.

19. The mobile terminal of claim 14, wherein the lower socket base defines pin apertures through which the second set of pins extends.

20. The mobile terminal of claim 14, wherein the lower socket base defines a recess sized to accommodate the SIM card therewithin.

21. The mobile terminal of claim 14, wherein the upper socket base defines an upper aperture through which the first set of pins extends.

22. The mobile terminal of claim 14, wherein the SD card comprises a microSD card.

23. The mobile terminal of claim 14, wherein the SIM card comprises a microSIM card.

24. The mobile terminal of claim 14 wherein the aperture is a single aperture sized such that the aperture allows insertion of both the SIM card and the SD card with a card insertion tool.

25. The mobile terminal of claim 14, wherein the mobile terminal comprises a smart phone.

26. The mobile terminal of claim 14, wherein the mobile terminal comprises a tablet.

27. A method of inserting cards into a socket, the method comprising:
  placing a subscriber identification module (SIM) card into a card insertion bracket;
  pushing the SIM card into the socket;
  using springs on a socket cover to push the SIM card into a SIM recess in a lower socket base;
  coupling conductors on the SIM card to a lower pin set in the socket;
  removing the card insertion bracket;
  reorienting a bracket spring in the card insertion bracket;
  placing a secure digital (SD) card into the card insertion bracket;
  holding the SD card in the card insertion bracket with the bracket spring;
  pushing the SD card into the socket such that the SD card is back to back with the SIM card within the socket, such that contacts of the SD card and contacts of the SIM card face opposite directions; and
  using the springs on the socket cover to push the SD card into contact with SD pins in the socket.

28. The method of claim 27 wherein pushing the SD card into the socket comprises pushing the SD card through a same aperture as the SIM card.

* * * * *